(12) United States Patent
Ishihara et al.

(10) Patent No.: US 10,524,104 B2
(45) Date of Patent: Dec. 31, 2019

(54) VEHICLE EMERGENCY CALL DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Toshiro Ishihara, Kariya (JP); Kano Asai, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/505,520

(22) PCT Filed: Aug. 19, 2015

(86) PCT No.: PCT/JP2015/004115
§ 371 (c)(1),
(2) Date: Feb. 21, 2017

(87) PCT Pub. No.: WO2016/035269
PCT Pub. Date: Mar. 10, 2016

(65) Prior Publication Data
US 2017/0251348 A1  Aug. 31, 2017

(30) Foreign Application Priority Data

Sep. 5, 2014  (JP) .................................. 2014-181588

(51) Int. Cl.
*H04M 11/04* (2006.01)
*H04W 4/90* (2018.01)
(Continued)

(52) U.S. Cl.
CPC ............ *H04W 4/90* (2018.02); *G08B 25/016* (2013.01); *G08B 25/04* (2013.01); *G08B 25/08* (2013.01);
(Continued)

(58) Field of Classification Search
None
See application file for complete search history.

(56) References Cited

U.S. PATENT DOCUMENTS

2003/0122669 A1* 7/2003 Filippov ................ B60N 2/002
340/563
2007/0096886 A1  5/2007 Lich et al.
(Continued)

FOREIGN PATENT DOCUMENTS

CN  1795474 A  6/2006
CN  103593927 A  2/2014
(Continued)

OTHER PUBLICATIONS

Lee_WO2004-071824 A1 -pub. date-8-26-04.pdf.*

*Primary Examiner* — Jinsong Hu
*Assistant Examiner* — Alexander J Yi
(74) *Attorney, Agent, or Firm* — Harness, Dickey & Pierce, P.L.C.

(57) ABSTRACT

A vehicle emergency call device equipped to a vehicle includes a condition determination portion determining whether an emergency call condition is satisfied, an emergency call portion transmitting an emergency call to an emergency call center by connecting a communication line with the emergency call center when the condition determination portion determines that the emergency call condition is satisfied, and an additional information collecting portion collecting, from the vehicle, additional information which indicating more detailed emergency situation of the vehicle.

(Continued)

When the condition determination portion determines that the emergency call condition is satisfied, the emergency call portion connects the communication line with the emergency call center in parallel with collecting of the additional information by the additional information collecting portion.

12 Claims, 6 Drawing Sheets

(51) Int. Cl.
*H04W 4/42* (2018.01)
*G08B 25/04* (2006.01)
*G08G 1/127* (2006.01)
*G08B 25/01* (2006.01)
*G08B 25/08* (2006.01)
*G08G 1/00* (2006.01)
*H04W 4/029* (2018.01)

(52) U.S. Cl.
CPC ............. *G08G 1/127* (2013.01); *G08G 1/205* (2013.01); *H04W 4/42* (2018.02); *H04W 4/029* (2018.02)

(56) References Cited

U.S. PATENT DOCUMENTS

| | | | |
|---|---|---|---|
| 2009/0207007 A1* | 8/2009 | Flick | G08G 1/205 340/436 |
| 2013/0079962 A1* | 3/2013 | Ishikawa | B60L 15/2045 701/22 |
| 2013/0190990 A1* | 7/2013 | Haidar | B60R 22/48 701/45 |
| 2013/0261892 A1* | 10/2013 | Inui | G06K 9/00832 701/36 |
| 2014/0187191 A1* | 7/2014 | Mader | H04W 4/90 455/404.1 |
| 2014/0300739 A1* | 10/2014 | Mimar | H04N 7/188 348/148 |
| 2015/0091737 A1* | 4/2015 | Richardson | E21B 41/00 340/853.2 |

FOREIGN PATENT DOCUMENTS

| | | |
|---|---|---|
| JP | 2000115413 A | 4/2000 |
| JP | 2008263580 A | 10/2008 |
| JP | 2010114588 A | 5/2010 |
| JP | 2010244167 A | 10/2010 |
| JP | 2011097293 A | 5/2011 |

* cited by examiner

VEHICLE EMERGENCY CALL DEVICE

CROSS REFERENCE TO RELATED APPLICATIONS

This application is a U.S. National Phase Application under 35 U.S.C. 371 of International Application No. PCT/JP2015/004115 filed on Aug. 19, 2015, and published in Japanese as WO 2016/035269 A1 on Mar. 10, 2016. This application is based on and claims the benefit of priority from Japanese Patent Application No. 2014-181588 filed on Sep. 5, 2014. The entire disclosures of all of the above applications are incorporated herein by reference.

TECHNICAL FIELD

The present disclosure relates to a vehicle emergency call device which transmits an emergency call to an emergency call center.

BACKGROUND ART

A vehicle emergency call device in the related art transmits an emergency call to an emergency call center upon input of a signal indicating an activation of a safety device, such as an air bag device or a seatbelt pretensioner, or upon input of a predetermined signal from an impact sensor equipped to a vehicle, such as an acceleration sensor. The vehicle emergency call device also transmits, to the emergency call center, a vehicle location together with the emergency call.

For example, Patent Literature 1 discloses a technique of notifying the emergency call center of not only a vehicle location but also information extracted from various sensors together with the emergency call. The information extracted from various sensors enables the emergency call center to grasp more detailed emergency situation of the vehicle, such as the number of on-board occupants, wearing or non-wearing of seatbelts, a collision direction, an occurrence or a non-occurrence of a pile-up collision, an occurrence or a non-occurrence of rollover, and a change of vehicle speed before and after a collision.

By reporting, to the emergency call center, the information (hereinafter, referred to as additional information) enabling the emergency call center to grasp more detailed emergency situation of the vehicle, it is considered that a more precise support can be provided for the emergency situation of the vehicle.

PRIOR ART LITERATURE

Patent Literature

[Patent Literature 1] JP 2010-244167 A

SUMMARY OF INVENTION

However, according to the technique disclosed in Patent Literature 1, which is thought to provide a more precise support for the emergency situation the vehicle is in, it takes a longer time to collect the additional information from the vehicle with an increase in types of the additional information and a volume of the additional information. Accordingly, transmitting of an emergency call to the emergency call center may be delayed.

In view of the foregoing difficulties, it is an object of the present disclosure to provide a vehicle emergency call device capable of reporting additional information based on which emergency situation of a vehicle can be grasped in more detail while restricting a delay in transmitting of an emergency call to an emergency call center.

According to an aspect of the present disclosure, a vehicle emergency call device equipped to a vehicle includes a condition determination portion determining whether an emergency call condition is satisfied, an emergency call portion transmitting an emergency call to an emergency call center by connecting a communication line with the emergency call center when the condition determination portion determines that the emergency call condition is satisfied, and an additional information collecting portion collecting, from the vehicle, additional information which enables the emergency call center to grasp more detailed emergency situation of the vehicle. The emergency call portion includes the additional information collected by the additional information collecting portion in the emergency call. When the condition determination portion determines that the emergency call condition is satisfied, the emergency call portion connects the communication line with the emergency call center in parallel with collecting of the additional information by the additional information collecting portion.

According to the configuration as above, the emergency call portion connects the communication line to the emergency call center in parallel with collecting of the additional information by the additional information collecting portion in a case where the condition determination portion determines that the emergency call condition is satisfied. Hence, a delay in transmitting of an emergency call can be restricted in comparison with a case where the emergency call portion starts a connection of the communication line with the emergency call center after collecting of the additional information is completed. The additional information reported in an emergency call is information which enables the emergency call center to grasp more detailed emergency situation of the vehicle. Hence, additional information which enables the emergency call center to grasp more detailed emergency situation of the vehicle can be reported to the emergency call center while restricting a delay in transmitting of an emergency call to the emergency call center.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION (Schematic Configuration of Vehicle Emergency Call System 100)

Figure 1:
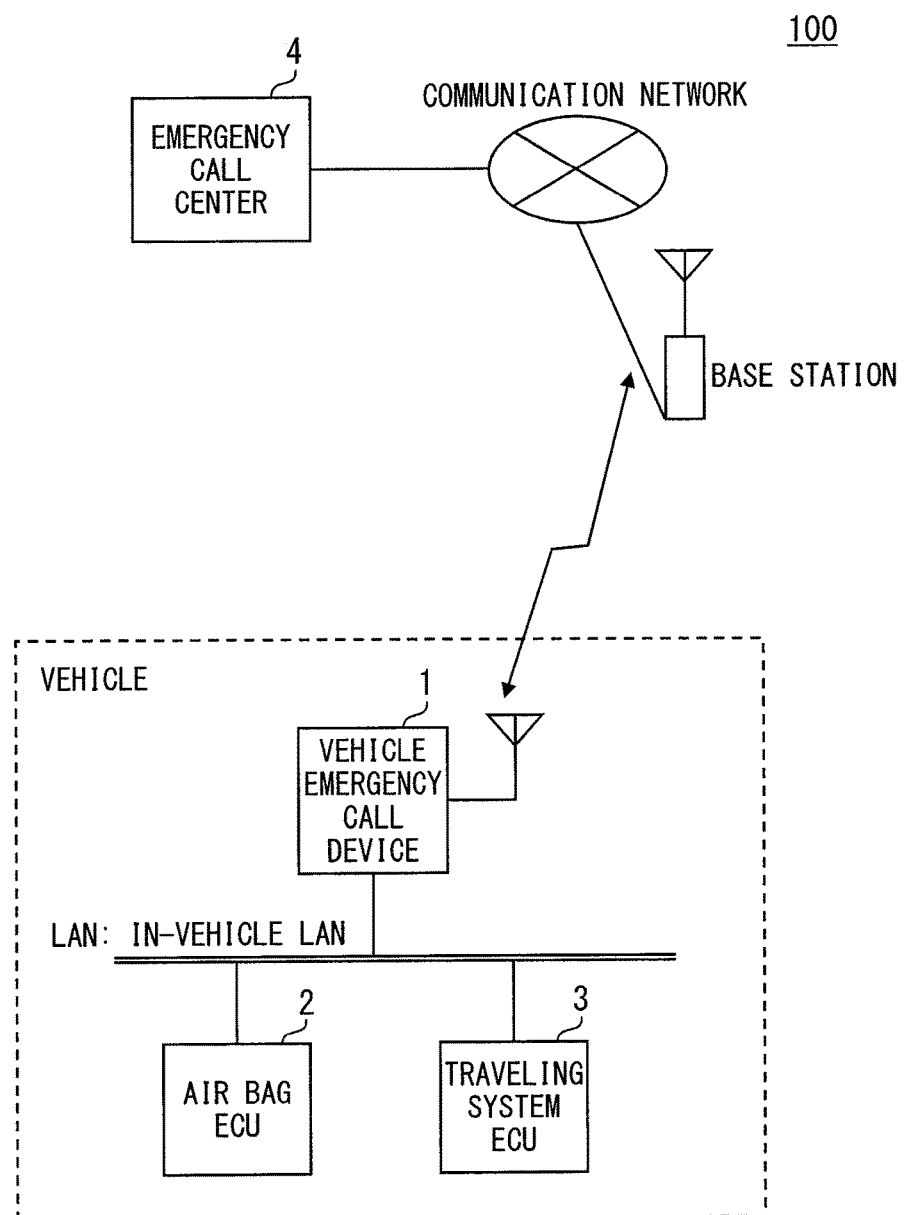
FIG. 1 is a diagram showing an example of a schematic configuration of a vehicle emergency call system.

FIG. 1 is a view showing an example of a schematic configuration of a vehicle emergency call system 100 to which the present disclosure is applied. As is shown in FIG. 1, the vehicle emergency call system 100 includes a vehicle emergency call device 1, an air bag ECU 2, a traveling system ECU 3, and an emergency call center 4. The vehicle emergency call device 1, the air bag ECU 2, and the traveling system ECU 3 are installed to a vehicle. The vehicle emergency call device 1, the air bag ECU 2, and the traveling system ECU 3 are interconnected via an in-vehicle LAN. Hereinafter, a vehicle equipped with the vehicle emergency call device 1, the air bag ECU 2, and the traveling system ECU 3 is referred to as the subject vehicle.

The air bag ECU 2 determines an occurrence of a frontal collision or a lateral collision of the subject vehicle according to an acceleration signal outputted from an acceleration sensor provided to the subject vehicle. Upon detection of a frontal collision or a lateral collision, the air bag ECU 2 deploys air bags by outputting an ignition signal to an air bag module.

In a case where the air bag ECU 2 outputs an ignition signal to the air bag module upon detection of a frontal collision or a lateral collision, the air bag ECU 2 also outputs an air bag deployment signal to the vehicle emergency call device 1 via the in-vehicle LAN. Besides an air bag deployment signal, the air bag ECU 2 outputs an acceleration signal indicating acceleration detected by the acceleration sensor provided to the subject vehicle and a rollover signal indicating whether the subject vehicle rolled over to the vehicle emergency call device 1 via the in-vehicle LAN upon detection of a frontal collision or a lateral collision. The air bag ECU 2 may determine whether the subject vehicle rolled over according to the acceleration signal.

Further, the air bag ECU 2 outputs, for example, a seatbelt signal indicating whether occupants are wearing seatbelts, which is detected by a seatbelt sensor provided to the subject vehicle, and a seating signal indicating whether an occupant is seated in each seat, which is detected by a seating sensor provided to each seat of the subject vehicle, to the vehicle emergency call device 1 via the in-vehicle LAN. In a case of the present embodiment, a seatbelt signal and a seating signal are successively outputted to the in-vehicle LAN, and an acceleration signal and a rollover signal are outputted upon detection of a frontal collision or a lateral collision.

The traveling system ECU 3 is an ECU related to a traveling of the subject vehicle, such as an engine ECU. The traveling system ECU 3 successively outputs a vehicle speed signal indicating a speed of the subject vehicle to the vehicle emergency call device 1 via the in-vehicle LAN. The vehicle speed signal is detected by a vehicle speed sensor provided to the subject vehicle.

The vehicle emergency call device 1 is a device which transmits an emergency call to a prescribed destination, such as the emergency call center 4 in case of an emergency, such as a collision accident of the subject vehicle. The vehicle emergency call device 1 may be provided by a communication module, for example, a DCM (Data Communication Module), which is used for telematics services. The vehicle emergency call device 1 will be described in detail below.

The emergency call center 4 is provided by, for example, a server. The emergency call center 4 deals with the emergency call upon receipt of the emergency call from the vehicle emergency call device 1 via a base station and a communication network, such as a mobile telephone network and an Internet network. For example, the emergency call center 4 may be an operation center of an emergency call service, which is known as one of the telematics services.

(Configuration of Vehicle Emergency Call Device 1)

Figure 2:
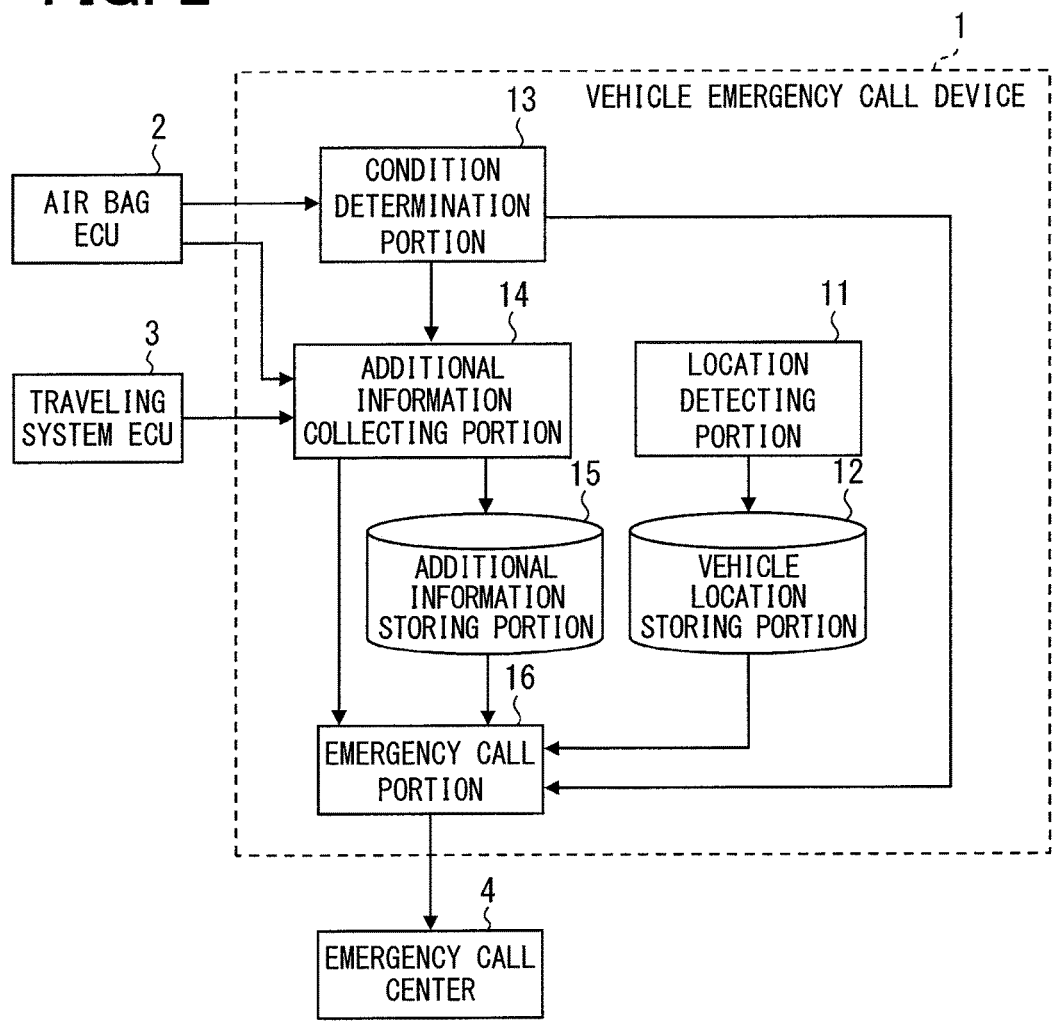
FIG. 2 is a block diagram showing an example of a schematic configuration of a vehicle emergency call device.

A schematic configuration of the vehicle emergency call device 1 will be described with reference to FIG. 2. As is shown in FIG. 2, the vehicle emergency call device 1 includes a location detecting portion 11, a vehicle location storing portion 12, a condition determination portion 13, an additional information collecting portion 14, an additional information storing portion 15, and an emergency call portion 16.

The location detecting portion 11 successively detects a present location of the subject vehicle using, for example, a positioning system which detects a present location of the subject vehicle (hereinafter, referred to as a vehicle location) according to a radio wave transmitted from a positioning satellite. The location detecting portion 11 stores the detected vehicle location into the vehicle location storing portion 12. In a case where the vehicle location is already stored in the vehicle location storing portion 12, the location detecting portion 11 overwrites a newly detected vehicle location on the stored vehicle location, thereby always storing a newest present location of the subject vehicle into the vehicle location storing portion 12 as the vehicle location. A history of the vehicle location may be saved in the vehicle location storing portion 12.

The condition determination portion 13 determines whether a condition for transmitting an emergency call (hereinafter, referred to as the emergency call condition) is satisfied. For example, the condition determination portion 13 determines that the emergency call condition is satisfied when an air bag deployment signal is inputted from the air bag ECU 2 and determines that the emergency call condition is not satisfied when there is no air bag deployment signal is inputted.

The additional information collecting portion 14 collects information (hereinafter, referred to as the additional information) which enables the emergency call center to grasp more detailed emergency situation of the subject vehicle. The additional information collecting portion 14 collects the additional information from the subject vehicle in addition to the vehicle location. In a case of the present embodiment, information collected as the additional information includes information indicating the number of occupants, wearing or non-wearing of seatbelts, a collision direction, an occurrence or a non-occurrence of a pile-up collision, an occurrence or a non-occurrence of rollover, and a change in vehicle speed before and after a collision.

Information indicating the number of occupants may be collected by obtaining a seating signal outputted from the air bag ECU 2 as described above. Information indicating wearing or non-wearing of seatbelts may be collected by obtaining a seatbelt signal outputted from the air bag ECU 2 as described above. Information indicating a collision direction and an occurrence or a non-occurrence of a pile-up collision may be collected by the additional information collecting portion 14. For example, the additional information collecting portion 14 may specify a collision direction and an occurrence or a non-occurrence of a pile-up collision according to an acceleration signal outputted from the air bag ECU 2. Information indicating an occurrence or a non-occurrence of rollover may be collected by obtaining a rollover signal outputted from the air bag ECU 2. Information indicating a change in vehicle speed before and after a collision may be collected by obtaining vehicle speed signals outputted from the traveling system ECU 3 before and after a collision.

Additional information directly related to a collision, such as a collision direction, an occurrence or a non-occurrence of a pile-up collision, an occurrence or a non-occurrence of rollover, and a change in vehicle speed before and after a collision, can be collected only after a collision occurs. Hence, the additional information collecting portion 14 collects the additional information directly related to a collision after it is determined that the emergency call condition is satisfied. The additional information directly related to a collision is, in other words, additional information of a type that needs to be collected after the condition determination portion 13 determines that the emergency call condition is satisfied. Hereinafter, the additional information directly related to a collision is referred to as non-preceding additional information.

On the contrary, additional information which is not related to a collision, such as the number of occupants and wearing or non-wearing of seatbelts, can be collected before a collision occurs. Hence, the additional information collecting portion 14 periodically collects the additional information unrelated to a collision before it is determined that the emergency call condition is satisfied and stores the collected additional information into the additional information storing portion 15. The additional information unrelated to a collision is, in other words, additional information of a type that can be collected before the condition determination portion 13 determines that the emergency call condition is satisfied. Hereinafter, the additional information unrelated to a collision is referred to as preceding additional information.

The additional information collecting portion 14 collects the preceding additional information periodically in cycles over which the preceding additional information, such as the number of occupants and wearing or non-wearing of seatbelts, is less likely to vary. For example, the additional information collecting portion 14 may collect the preceding additional information periodically every several seconds. Process related to collecting of the preceding additional information by the additional information collecting portion 14 will be described in detail as preceding additional information collecting related process.

The emergency call portion 16 connects a communication line between the vehicle emergency call device 1 and the emergency call center 4 and transmits an emergency call to the emergency call center 4 via the base station and the communication network after a task of connecting the communication line is completed. In a case of the present embodiment, the emergency call portion 16 sends a call connection request signal requesting a call connection between the vehicle emergency call device 1 and the emergency call center 4 to the emergency call center 4 via the base station and the communication network. The emergency call portion 16 completes the call connection task by finishing a series of processing steps to establish a call connection with the emergency call center 4.

The emergency call portion 16 transmits an emergency call by notifying the emergency call center 4 of the vehicle location stored in the vehicle location storing portion 12 and identification information which identifies the subject vehicle. The identification information which identifies the subject vehicle may be a vehicle ID assigned to the subject vehicle or a device ID assigned to the vehicle emergency call device 1. The emergency call portion 16 also notifies the preceding additional information and the non-preceding additional information, a detail of information notification will be described below as an emergency call related process.

(Preceding Additional Information Collecting Related Process)

Figure 3:
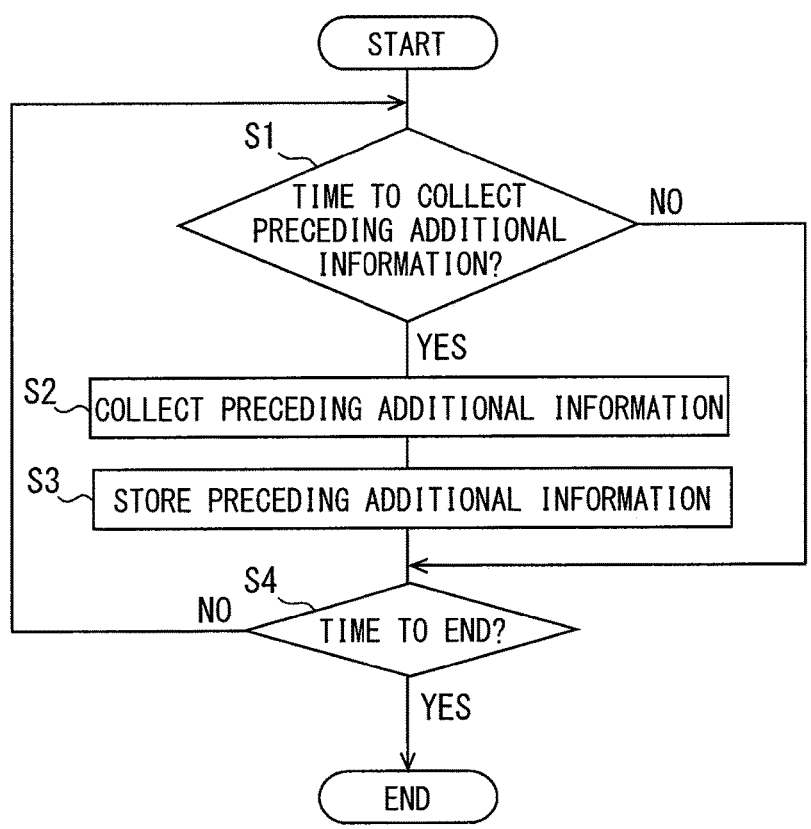
FIG. 3 is a flowchart showing an exemplary flow of preceding additional information collecting related process according to one embodiment.

Process related to collecting of the preceding additional information (hereinafter, referred to as the preceding additional information collecting related process) in the vehicle emergency call device 1 will now be described with reference to a flowchart of FIG. 3. The flowchart of FIG. 3 begins when, for example, an ignition power supply of the subject vehicle is switched on (that is, IG-ON).

Firstly, when it is found in step S1 that it is time to collect the preceding additional information (YES in S1), the process proceeds to step S2. Meanwhile, when it is found that it is not time to collect the preceding additional information (NO in S1), the process proceeds to step S4.

Whether it is time to collect the preceding additional information may be determined as follows. For example, when the preceding additional information has not been collected after the flowchart of FIG. 3 begins, the process may be executed after an elapse of a predetermined time period, for example, several seconds after the flowchart of FIG. 3 beings. In a case where the preceding additional information has been collected after the flowchart of FIG. 3 begins, the process may be repeatedly executed after an elapse of a predetermined time period, for example, several seconds, after the last collection of the preceding additional information. Accordingly, the additional information collecting portion 14 periodically collects the preceding additional information, for example, every several seconds.

In step S2, since it is determined time to collect the preceding additional information, the additional information collecting portion 14 collects the preceding additional information, such as the number of occupants and wearing or non-wearing of seatbelts, successively outputted from the air bag ECU 2 or the like.

In step S3, the additional information collecting portion 14 stores the preceding additional information collected in S2 into the additional information storing portion 15. In a case where the preceding additional information of a same type is already stored in the additional information storing portion 15, the additional information collecting portion 14 stores new preceding additional information by overwriting the new preceding additional information on the old preceding additional information. That is to say, of the preceding additional information of a same type collected periodically, newest preceding additional information is stored in the additional information storing portion 15.

When it is found in step S4 that it is time to end the preceding additional information collecting related process (YES in S4), the preceding additional information collecting related process is ended. Meanwhile, when it is found that it is not time to end the preceding additional information collecting related process (NO in S4), the flow returns to S1 to repeat the process. An example of the time to end the preceding additional information collecting related process may be when the ignition power supply of the subject vehicle is switched OFF (that is, IG-OFF).

(Emergency Call Related Process)

Process related to an emergency call (hereinafter, referred to as the emergency call related process) in the vehicle emergency call device 1 will now be described with reference to a flowchart of FIG. 4. The flowchart of FIG. 4 begins when, for example, the ignition power supply of the subject vehicle is switched ON.

Firstly in step S21, the condition determination portion 13 determines whether the emergency call condition is satisfied. When it is determined that the emergency call condition is satisfied (YES in S21), the process proceeds to step S23.

Meanwhile, when it is determined that the emergency call condition is not satisfied (NO in S21), the process proceeds to step S22.

When it is found in step S22, to which the process proceeded because it is determined that the emergency call condition is not satisfied, that it is time to end the emergency call related process (YES in S22), the emergency call related process is ended. Meanwhile, when it is found that it is not the time to end the emergency call related process (NO in S22), the flow returns to S21 to repeat the process. An example of the time to end the emergency call related process is at IG-OFF of the subject vehicle.

In step S23, to which the process proceeded because it is determined that the emergency call condition is satisfied, the emergency call portion 16 sends a call connection request signal to the emergency call center 4 and starts a call connection task. In step S24, the additional information collecting portion 14 starts to collect the non-preceding additional information which cannot be collected unless a collision occurs, such as a collision direction, an occurrence or a non-occurrence of a pile-up collision, an occurrence or a non-occurrence of rollover, and a change in vehicle speed before and after a collision.

The vehicle emergency call device 1 is configured at least in such a manner that the emergency call portion 16 establishes a call connection with the emergency call center 4 in parallel with collecting of the non-preceding additional information by the additional information collecting portion 14. Hence, the vehicle emergency call device 1 may be configured so as to perform process in S23 and process in S24 in parallel.

When it is found in step S25 that a task of establishing a call connection with the emergency call center 4 is completed (YES in S25), the process proceeds to step S26. Meanwhile, when it is found that a task of establishing a call connection with the emergency call center 4 is not completed (NO in S25), process in step S25 is repeated.

In step S26, the emergency call portion 16 reads out the vehicle location stored in the vehicle location storing portion 12 and the preceding additional information stored in the additional information storing portion 15. The vehicle location stored in the vehicle location storing portion 12 and the preceding additional information stored in the additional information storing portion 15 are detected or collected and stored in the corresponding storing portions before it is determined that the emergency call condition is satisfied in S21.

When it is found in step S27 that a reception wait duration of the non-preceding additional information has elapsed (YES in S27), collecting of the non-preceding additional information is forcedly ended and the process proceeds to step S28. Meanwhile, when it is found that the reception wait duration of the non-preceding additional information has not elapsed (NO in S27), process in S27 is repeated.

The reception wait duration of the non-preceding additional information can be set arbitrarily, and may be set to, for example, three seconds after collecting of the non-preceding additional information is started. The reception wait duration corresponds to a predetermined period. In a case where the additional information collecting portion 14 failed to collect the non-preceding additional information within the reception wait duration of the non-preceding additional information because, for example, signal lines of the in-vehicle LAN are short-circuited due to an impact resulting from a collision of the subject vehicle, collecting is forcedly ended even though none of the non-preceding additional information is collected.

In step S28, in a case where the additional information collecting portion 14 succeeded in collecting the non-preceding additional information, the emergency call portion 16 generates an emergency call message including the vehicle location, the preceding additional information read out in S26, the identification information which identifies the subject vehicle, and the non-preceding additional information when it is successfully collected. In a case where the additional information collecting portion 14 failed to collect the non-preceding additional information, the emergency call portion 16 generates an emergency call message including the vehicle location, the preceding additional information read out in S26, and the identification information which identifies the subject vehicle.

In step S29, the emergency call portion 16 sends the emergency call message generated in S28 (that is, transmits a call) to the emergency call center 4 via the base station and the communication network.

Upon receipt of the emergency call message (that is, an emergency call), the emergency call center 4 dispatches emergency staff to a spot of the vehicle collision according to the notified vehicle location, and provides a support needed for an emergency situation the subject vehicle is in. Herein, the emergency situation of the subject vehicle is grasped by the emergency staff according to the received preceding additional information and the non-preceding additional information.

According to the configuration of the present embodiment, in a case where the condition determination portion 13 determines that the emergency call condition is satisfied, the emergency call portion 16 establishes a call connection with the emergency call center 4 in parallel with collecting of the non-preceding additional information by the additional information collecting portion 14. Hence, in comparison with a case where a communication line is connected to the emergency call center 4 after collecting of the non-preceding additional information is completed, a delay in transmitting of an emergency call can be restricted.

Also, according to the present embodiment, the preceding additional information is collected and stored in the additional information storing portion 15 in advance before the condition determination portion 13 determines that the emergency call condition is satisfied. The configuration as above can reduce the size and types of the additional information collected after it is determined that the emergency call condition is satisfied. Accordingly, the configuration as above can shorten a duration taken for collecting the additional information which starts from determination of the emergency call condition is satisfied and continues until collecting of the additional information is completed. Consequently, a delay in notification of the additional information in transmitting of an emergency call can be restricted.

Further, according to the configuration of the present embodiment, among the preceding additional information of a same type collected periodically, newest preceding additional information is stored in the additional information storing portion 15. Hence, the preceding additional information to be notified in transmitting of an emergency call can be the preceding additional information at a time closest to a time when the subject vehicle had a collision. The preceding additional information at a time closest to a time when the subject vehicle had a collision is most probably same as preceding additional information at a time when the subject vehicle had a collision. Hence, an emergency situation the subject vehicle is in can be grasped more exactly from the preceding additional information at an end of the emergency call center 4. Consequently, a more precise support can be provided for the emergency situation.

Furthermore, according to the configuration of the present embodiment, in a case where the reception wait duration of the non-preceding additional information has elapsed, an emergency call is transmitted forcedly by ending collecting of the non-preceding additional information. Hence, in a case where the additional information collecting portion 14 is no longer capable of collecting the non-preceding additional information because, for example, the signal lines of the in-vehicle LAN are short-circuited due to an impact of a collision of the subject vehicle, the additional information collecting portion 14 can be prevented from endlessly waiting for the non-preceding additional information which can no longer be collected. Consequently, the configuration as above can save a time wasted by endlessly waiting for the non-preceding additional information which can no longer be collected.

(First Modification)

The embodiment above has described the emergency call related process configured in such a manner that the non-preceding additional information that is successfully collected within the reception wait duration of the non-preceding additional information is notified in addition to the vehicle location and the preceding additional information that is collected in advance. However, the present disclosure is not limited to the configuration as above. For example, it may be configured in such a manner that the vehicle location and the preceding additional information collected in advance are notified earlier than the non-preceding additional information (hereinafter, referred to as the first modification). For ease of description, members furnished with same functions as the functions furnished to the members shown in the drawings used to describe the embodiment above will be labeled with same reference symbols in descriptions of the first modifications and following modifications below to omit a repetitive description.

A vehicle emergency call system 100 of the first modification is similar to the vehicle emergency call system 100 of the embodiment above except for a part of the emergency call related process executed by the vehicle emergency call device 1.

(Emergency Call Related Process in First Modification)

Emergency call related process in the first modification will now be described with reference to a flowchart of FIG. 5. Similar to the flowchart of FIG. 4, the flowchart of FIG. 5 may begin when, for example, the ignition power supply of the subject vehicle is switched ON.

Figure 4:
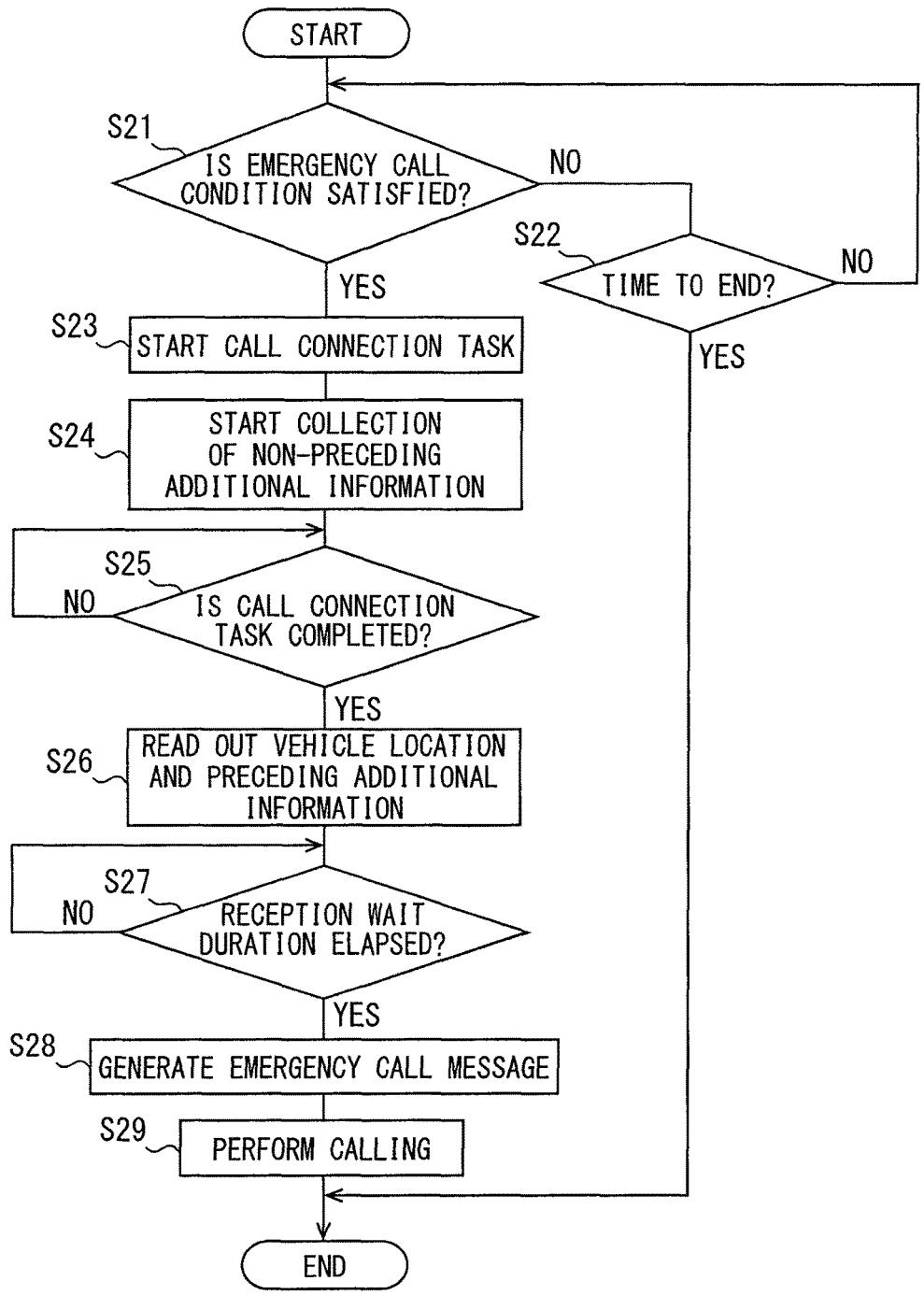
FIG. 4 is a flowchart showing an exemplary flow of emergency call related process according to one embodiment.
Figure 5:
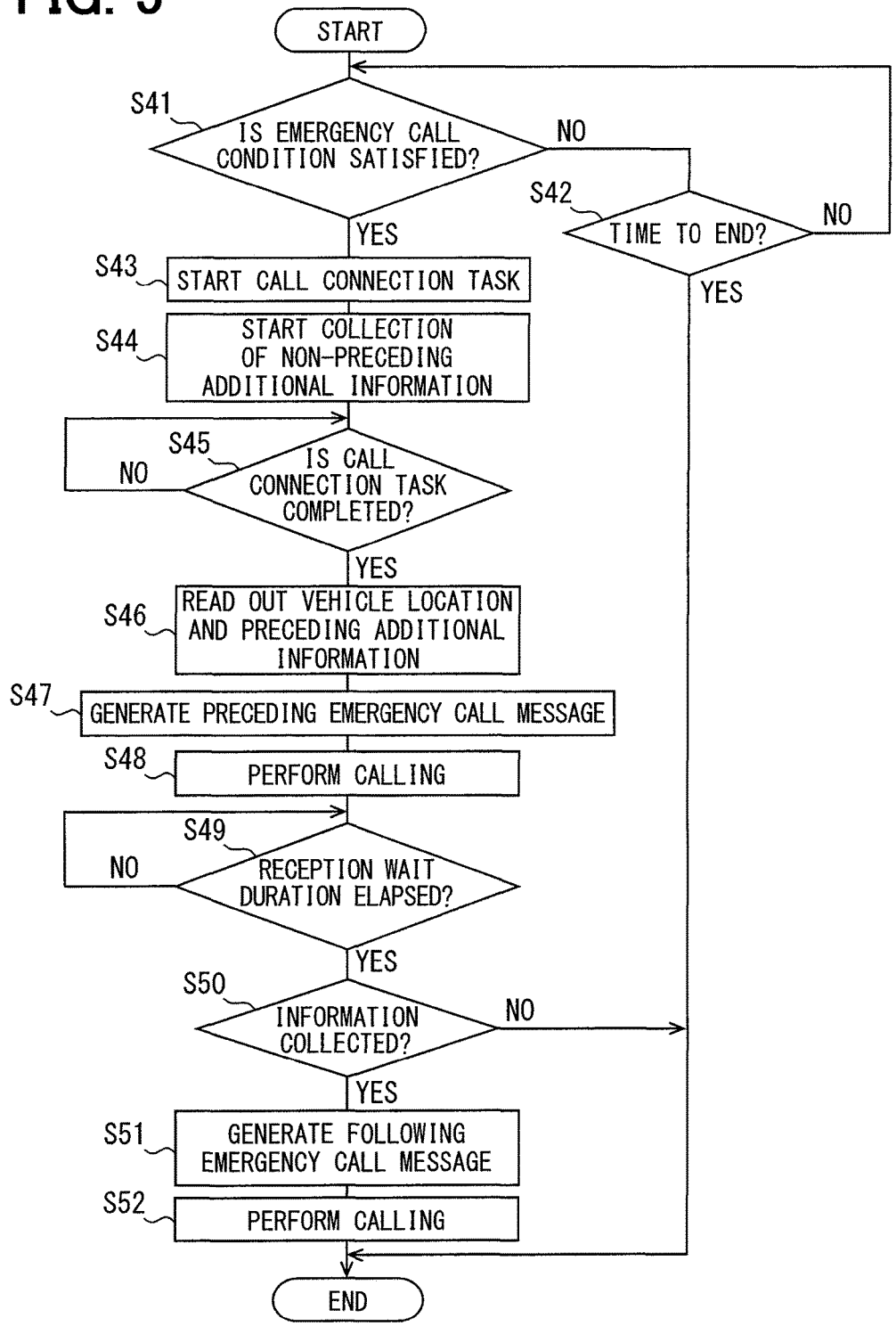
FIG. 5 is a flowchart showing an exemplary flow of the emergency call related process according to a first modification.

Process in steps S41 through S46 are same as the process in S21 through S26 in the flowchart of FIG. 4. In step S47, the emergency call portion 16 generates an emergency call message (hereinafter, referred to as the preceding emergency call message) including the vehicle location and the preceding additional information read out in S46 and the identification information which identifies the subject vehicle. In step S48, the emergency call portion 16 sends the preceding emergency call message generated in S47 (that is, transmits a call) to the emergency call center 4 via the base station and the communication network.

Similar to the process in S27 described above, when it is found in step S49 that the reception wait duration of the non-preceding additional information has elapsed (YES in S49), the process proceeds to step S50 by forcedly ending collecting of the non-preceding additional information. Meanwhile, when it is found that the reception wait duration of the non-preceding additional information has not elapsed (NO in S49), process in S49 is repeated.

When it is found in step S50 that the additional information collecting portion 14 succeeded in collecting the non-preceding additional information within the reception wait duration of the non-preceding additional information (YES in S50), the process proceeds to step S51. Meanwhile, when it is found that the additional information collecting portion 14 failed to collect the non-preceding additional information within the reception wait duration of the non-preceding additional information (NO in S50), the non-preceding additional information is not notified to the emergency call center 4 and the emergency call related process is ended. It should be noted that even in a case where the non-preceding additional information is not notified, the vehicle location and the preceding additional information are notified to the emergency call center 4 by process in S48.

In step S51, the emergency call portion 16 generates an emergency call message including the non-preceding additional information collected by the additional information collecting portion 14 (hereinafter, referred to as the following emergency call message). The following emergency call message does not include the vehicle location and the preceding additional information which are notified earlier to the emergency call center 4 by the process in S48. In step S52, the emergency call portion 16 sends the following emergency call message generated in S51 (that is, transmits a call) to the emergency call center 4 via the base station and the communication network.

(Summary of First Modification)

The configuration of the first modification is similar to the configuration of the embodiment above except for a part of the emergency call related process in the vehicle emergency call device 1. Hence, similar to the embodiment above, a delay in transmitting of an emergency call to the emergency call center 4 can be restricted.

Further, according to the configuration of the first modification, the vehicle location and the preceding additional information collected in advance are notified to the emergency call center 4 earlier than the non-preceding additional information. Hence, the vehicle location and the preceding additional information can be notified to the emergency call center 4 earlier than in a case where the vehicle location and the preceding additional information are notified after collecting of the non-preceding additional information is completed. By notifying the vehicle location and the preceding additional information earlier in time to the emergency call center 4, an emergency situation the subject vehicle is in can be grasped by the emergency call center earlier in time within a range covered by the preceding additional information at an end of the emergency call center 4. Consequently, a more precise support can be provided at an earlier time for the emergency situation.

(Second Modification)

The embodiment above has described the preceding additional information collecting related process configured in such a manner that the additional information collecting portion 14 collects the preceding additional information periodically. However, the present disclosure is not limited to the configuration as above. For example, it may be configured in such a manner that the additional information collecting portion 14 collects the preceding additional information in each trip of the vehicle (hereinafter, referred to as the second modification). The term, "trip", referred to herein means a predetermined unit for counting travels of the vehicle. Herein, a description will be given in a case where the trip is defined to be a traveling unit from IG-ON to IG-OFF.

An vehicle emergency call system 100 of the second modification is similar to the vehicle emergency call system 100 of the embodiment above except for a part of the preceding additional information collecting related process in the vehicle emergency call device 1.

(Preceding Additional Information Collecting Related Process in Second Modification)

Figure 6:
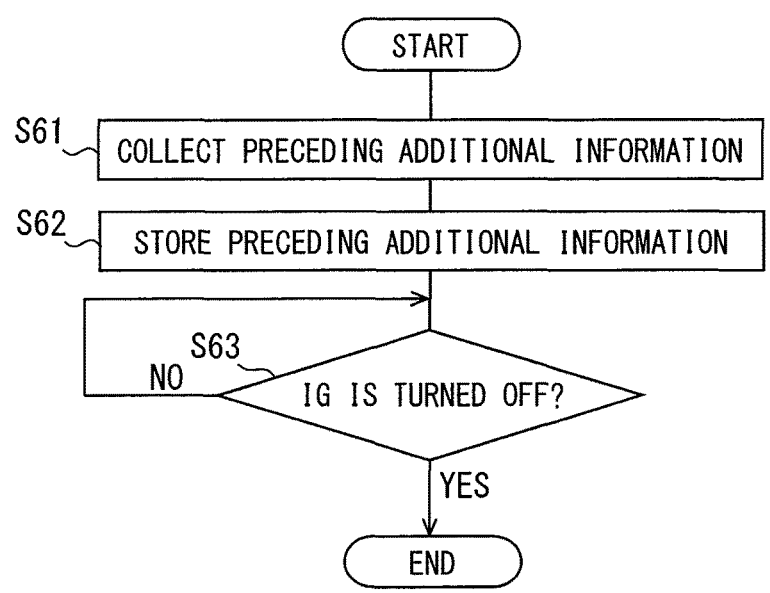
FIG. 6 is a flowchart showing an exemplary flow of preceding additional information collecting related process according to a second modification.

Preceding additional information collecting related process in the second modification will now be described with reference to a flowchart of FIG. 6. The flowchart of FIG. 6 begins in response to IG-ON of the subject vehicle.

In step S61, the additional information collecting portion 14 collects the preceding additional information successively outputted from the air bag ECU 2, such as the number of occupants and wearing or non-wearing of seatbelts. It may be configured in such a manner that process in S61 is performed immediately after the flowchart of FIG. 6 beings. However, the number of occupants or the occupant's wearing state of the seatbelt may change within a duration from the IG-ON to the traveling start of the subject vehicle. Hence, it is preferable to perform the process in S61 after the subject vehicle starts traveling.

For example, the additional information collecting portion 14 may collect the preceding additional information after a determination is made that the subject vehicle started traveling according to a vehicle speed of the subject vehicle. Alternatively, the additional information collecting portion 14 may collect the preceding information after an elapse of a predetermined time long enough to assume that the subject vehicle started traveling after IG-ON.

In step S62, similar to S3 described above, the additional information collecting portion 14 stores the preceding additional information collected in S61 into the additional information storing portion 15. When IG-OFF of the subject vehicle is detected in step S63 (YES in S63), the preceding additional information collecting related process is ended. Meanwhile, when IG-OFF of the subject vehicle is not detected (NO in S63), the flow returns to S61 to repeat the process. Accordingly, the additional information collecting portion 14 stores the preceding additional information of a present trip into the additional information storing portion 15.

(Third Modification)

The embodiment above has described the configuration in which the location detecting portion 11 is provided to the vehicle emergency call device 1. As described above, the location detecting portion 11 detects a vehicle location which is to be notified to the emergency call center by transmitting of the emergency call. However, the present disclosure is not limited to the configuration as above. For example, it may be configured in such a manner that the location detecting portion 11 is not provided to the vehicle emergency call device 1. In this configuration, a vehicle location may be obtained successively from another device disposed outside the vehicle emergency call device 1. For example, the vehicle location may be obtained from a navigation device or a locater equipped to the subject vehicle.

(Fourth Modification)

The embodiment above has described the configuration in which it is determined that the emergency call condition is satisfied upon input of an air bag deployment signal as an example. Alternatively, it may be configured in such a manner that the emergency call condition is determined to be satisfied upon input of a collision detection signal outputted from a collision detection sensor provided to the subject vehicle. Herein, the collision detection sensor outputs the collision detection signal when detecting an impact or an activation signal indicating activation of a collision safety device other than air bags.

(Fifth Modification)

The embodiment above has described the configuration in which the preceding additional information and the non-preceding additional information are collected by the air bag ECU 2 and the traveling system ECU 3. However, the present disclosure is not limited to the configuration as above. For example, the preceding additional information and the non-preceding additional information may be collected by ECUs or a group of various sensors, instead of the air bag ECU 2 and the traveling system ECU 3.

(Sixth Modification)

The embodiment above has described the configuration in which information indicating the number of occupants and wearing or non-wearing of seatbelts are collected as the preceding additional information, and information indicating a collision direction, an occurrence or a non-occurrence of a pile-up collision, an occurrence or a non-occurrence of rollover, and a change in vehicle speed before and after a collision are collected as the non-preceding additional information. However, the present disclosure is not limited to the configuration as above. For example, it may be configured so as to collect information of a type enabling the emergency call center to grasp more detailed emergency situation of the subject vehicle other than the above-described types of information.

For example, an acceleration signal of an acceleration sensor provided to a front part or a rear part or inside a bumper of the subject vehicle may be obtained as the non-preceding additional information. Moreover, an image signal including an image captured by an imaging device for capturing an image around the subject vehicle may be obtained, or information of multiple vehicle locations in time series (that is, a travel history) may be collected as the preceding additional information.

(Seventh Modification)

The above embodiment has described the configuration in which the reception wait duration of the non-preceding additional information is set. However, the present disclosure is not limited to the configuration as above. For example, it may be configured in such a manner that the reception wait duration of the non-preceding additional information is not set. In this configuration, the emergency call portion 16 waits until collecting of target non-preceding additional information is completed, and then transmits a call including the non-preceding additional information (hereinafter, referred to as the seventh modification).

According to the seventh modification, too, a communication line is connected between the vehicle emergency call device 1 and the emergency call center 4 in parallel with collecting of the non-preceding additional information. Hence, a delay in transmitting of an emergency call to the emergency call center 4 can be restricted in comparison with a configuration in which a communication line is connected between the vehicle emergency call device 1 and the emergency call center 4 after collecting of the non-preceding additional information is completed.

(Eighth Embodiment)

The embodiment above has described the configuration in which the preceding additional information is collected and stored in the additional information storing portion 15 in advance before the condition determination portion 13 determines that the emergency call condition is satisfied. However, the present disclosure is not limited to the configuration as above. For example, it may be configured in such a manner that the preceding additional information is collected after the condition determination portion 13 determines that the emergency call condition is satisfied (hereinafter, referred to as the eighth modification).

According the configuration of the eighth modification, too, a communication line is connected between the vehicle emergency call device 1 and the emergency call center 4 in parallel with collecting of the preceding additional information and the non-preceding additional information. Hence, a delay in transmitting of an emergency call to the emergency call center 4 can be restricted in comparison with a configuration in which a communication line is connected between the vehicle emergency call device 1 and the emergency call center 4 after collecting of the preceding additional information and the non-preceding additional information is completed.

It is noted that a flowchart or the processing of the flowchart in the present disclosure includes portions (also referred to as steps), each of which is represented, for instance, as S1. Further, each portion can be divided into several sub-portions while several portions can be combined into a single portion. Furthermore, each of thus configured portions can be also referred to as a circuit, device, module, or means. Each or any combination of portions explained in the above can be achieved as (i) a software portion in combination with a hardware unit (e.g., computer) or (ii) a hardware portion, including or not including a function of a related apparatus; furthermore, the hardware portion (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A vehicle emergency call device equipped to a vehicle comprising:
   a condition determination portion determining whether an emergency call condition is satisfied;
   an emergency call portion transmitting an emergency call to an emergency call center by connecting a communication line with the emergency call center and notifying the emergency call center of a location of the vehicle and the identification information that identifies the vehicle when the condition determination portion determines that the emergency call condition is satisfied; and
   an additional information collecting portion collecting, from the vehicle, additional information which enables the emergency call center to grasp more detailed emergency situation of the vehicle, the additional information including first additional information collected before the emergency call condition is satisfied and second additional information collected after the emergency call condition is satisfied;
   wherein when the condition determination portion determines that the emergency call condition is satisfied, the emergency call portion establishes a call connection with the emergency call center in parallel with the additional information collecting portion collecting the second additional information, and the emergency call portion transmits the emergency call and at least a portion of the additional information including at least the first additional information to the emergency call center after the call connection is established,
   wherein the additional information collecting portion collects the additional information based on signals input from an air bag electronic control unit equipped to the vehicle and a travelling system electronic control unit equipped to the vehicle,
   wherein the first additional information includes at least one of (i) a number of occupants of the vehicle based on a seating signal outputted from the air bag electronic control unit, and (ii) a number of occupants wearing seatbelts in the vehicle based on a seatbelt signal outputted from the air bag electronic control unit, and the second additional information includes at least one of (iii) a collision direction based on an acceleration signal outputted from the air bag electronic control unit, (iv) an indication of whether a rollover occurred based on a rollover signal outputted from the air bag electronic unit, and (v) an indication of a change in vehicle speed from before the emergency call condition is satisfied until after the emergency call condition is satisfied based on vehicle speed signals outputted from the travelling system electronic control unit,
   wherein the additional information collecting portion determines whether the second additional information has been successfully collected within a predetermined duration from a start of the collecting of the second additional information,
   wherein, when the additional information collecting portion determines that the second additional information has been successfully collected within the predetermined duration, the emergency call portion transmits the first additional information and the second additional information with the emergency call to the emergency call center, and
   wherein, when additional information collecting portion determines that the second additional information has not been successfully collected within the predetermined duration, the additional information collecting portion forcedly ends collecting of the second additional information and the emergency call portion transmits the first additional information with the emergency call to the emergency call center.

2. The vehicle emergency call device according to claim 1, wherein
   the additional information collecting portion is capable of collecting, as the additional information, a plurality of additional information pieces having different types,
   the additional information collecting portion collects one of the plurality of additional information pieces before the condition determination portion determines that the emergency call condition is satisfied when the one of the plurality of additional information pieces can be collected before the condition determination portion determines that the emergency call condition is satisfied,
   the vehicle emergency call device further comprises an additional information storing portion which stores the one of the plurality of additional information pieces collected by the additional information collecting portion before the condition determination portion determines that the emergency call condition is satisfied, and
   when the emergency call portion transmits the emergency call to the emergency call center by connecting the communication line with the emergency call center, the additional information collecting portion reads out the one of the plurality of additional information pieces stored in the additional information storing portion without newly collecting the additional information, and the emergency call portion reports, to the emergency call center, the one of the plurality of additional information pieces read out from the additional information storing portion.

3. The vehicle emergency call device according to claim 2, wherein
the additional information collecting portion periodically collects the one of the plurality of additional information pieces before the condition determination portion determines that the emergency call condition is satisfied, and
the additional information storing portion stores the one of the plurality of additional information pieces which is newest among a plurality of the one of the plurality of additional information pieces which are periodically collected by the additional information collecting portion before the condition determination portion determines that the emergency call condition is satisfied.

4. The vehicle emergency call device according to claim 2, wherein
the additional information collecting portion collects the one of the plurality of additional information pieces before the condition determination portion determines that the emergency call condition is satisfied in every trip which is a predetermined travelling unit of the vehicle, and
the additional information storing portion stores a plurality of the one of the plurality of additional information pieces collected in a plurality of previous trips by the additional information collecting portion before the condition determination portion determines that the emergency call condition is satisfied.

5. The vehicle emergency call device according to claim 2, wherein
when a task of connecting the communication line with the emergency call center is completed, the emergency call portion reports, to the emergency call center, the one of the plurality of additional information pieces stored in the additional information storing portion by reading out the one of the plurality of additional information pieces from the additional information storing portion.

6. The vehicle emergency call device according to claim 1, wherein
the additional information collecting portion is capable of collecting, as the additional information, a plurality of additional information pieces having different types, and
the additional information collecting portion collects a different one of the plurality of additional information pieces after the condition determination portion determines that the emergency call condition is satisfied when the different one of the plurality of additional information pieces needs to be collected after the condition determination portion determines that the emergency call condition is satisfied.

7. The vehicle emergency call device according to claim 1,
wherein the first additional information includes (i) the number of occupants of the vehicle based on the seating signal outputted from the air bag electronic control unit and (ii) the number of occupants wearing seatbelts in the vehicle based on the seatbelt signal outputted from the air bag electronic control unit, and
wherein the second additional information includes (iii) the collision direction based on the acceleration signal outputted from the air bag electronic control unit, (iv) the indication of whether the rollover occurred based on the rollover signal outputted from the air bag electronic unit, and (v) the indication of the change in vehicle speed from before the emergency call condition is satisfied until after the emergency call condition is satisfied based on vehicle speed signals outputted from the travelling system electronic control unit.

8. The vehicle emergency call device according to claim 1, wherein the first additional information is collected periodically by the additional information collecting portion and the second information is collected non-periodically by the additional information collecting portion after the emergency condition is satisfied.

9. The vehicle emergency call device according to claim 1, wherein the first additional information and the second additional information are different types of information.

10. The vehicle emergency call device according to claim 9, wherein the first additional information includes an image of surroundings of the vehicle captured by an imaging device of the vehicle.

11. The vehicle emergency call device according to claim 1, wherein the emergency call portion transmits the emergency call and all of the additional information including the first additional information and the second additional information to the emergency call center after the call connection is established.

12. A vehicle emergency call device equipped to a vehicle comprising:
a condition determination portion determining whether an emergency call condition is satisfied;
an emergency call portion transmitting an emergency call to an emergency call center by connecting a communication line with the emergency call center and notifying the emergency call center of a location of the vehicle and the identification information that identifies the vehicle when the condition determination portion determines that the emergency call condition is satisfied; and
an additional information collecting portion collecting, from the vehicle, additional information which enables the emergency call center to grasp more detailed emergency situation of the vehicle, the additional information including first additional information collected before the emergency call condition is satisfied and second additional information collected after the emergency call condition is satisfied;
wherein when the condition determination portion determines that the emergency call condition is satisfied, the emergency call portion establishes a call connection with the emergency call center in parallel with the additional information collecting portion collecting the second additional information, and the emergency call portion transmits the emergency call and at least a portion of the additional information including at least the first additional information to the emergency call center after the call connection is established,
wherein the additional information collecting portion collects the additional information based on signals input from an air bag electronic control unit equipped to the vehicle and a travelling system electronic control unit equipped to the vehicle,
wherein the first additional information includes at least one of (i) a number of occupants of the vehicle based on a seating signal outputted from the air bag electronic control unit, and (ii) a number of occupants wearing seatbelts in the vehicle based on a seatbelt signal outputted from the air bag electronic control unit, and the second additional information includes at least one of (iii) a collision direction based on an acceleration signal outputted from the air bag electronic control unit, (iv) an indication of whether a rollover occurred based on a rollover signal outputted from the air bag electronic unit, and (v) an indication of a change in vehicle speed from before the emergency call condition is satisfied until after the emergency call condition is satisfied based on vehicle speed signals outputted from the travelling system electronic control unit, wherein the emergency call portion transmits the emergency call and the first additional information to the emergency call center prior to the second additional information, wherein, after the emergency call portion transmits the emergency call and the first additional information to the emergency call center, the additional information collecting portion determines whether the second additional information has successfully been collected within a predetermined duration from a start of the collecting of the second additional information, wherein, when the additional information collecting portion determines that the second additional information has been successfully collected within the predetermined duration, the emergency call portion transmits the second additional information to the emergency call center, and wherein, when additional information collecting portion determines that the second additional information has not been successfully collected within the predetermined duration, the additional information collecting portion forcedly ends collecting of the second additional information.

* * * * *